B. TAMBURELLO.
DEMOUNTABLE RIM FOR TIRES.
APPLICATION FILED APR. 15, 1919.
1,320,104.
Patented Oct. 28, 1919.
2 SHEETS—SHEET 1.
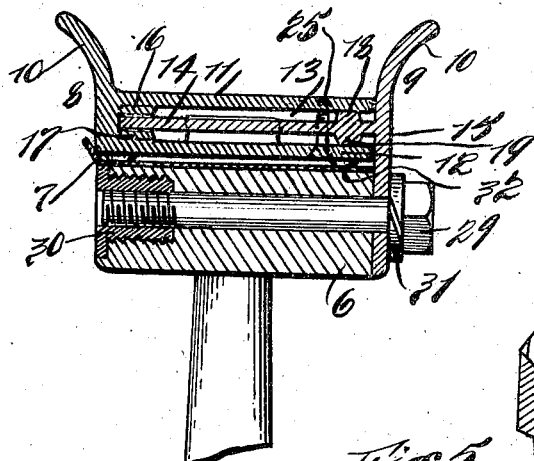
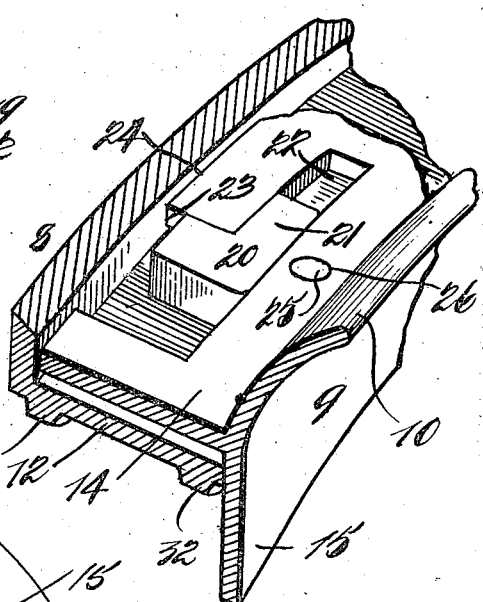
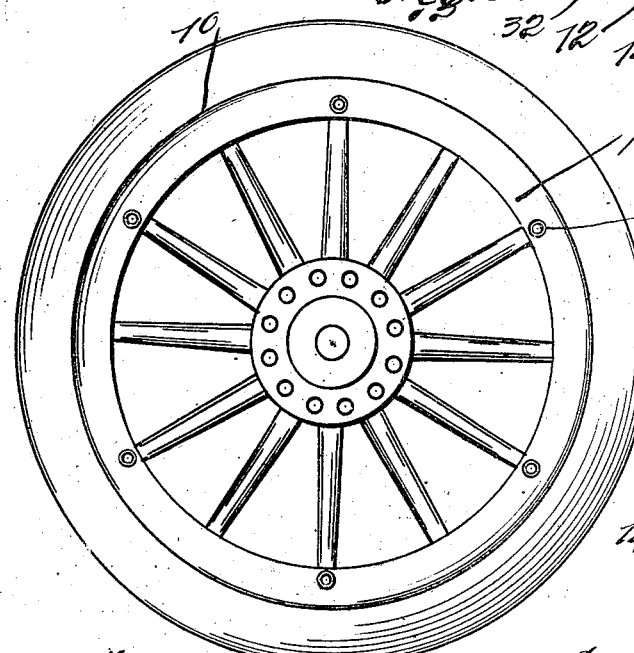
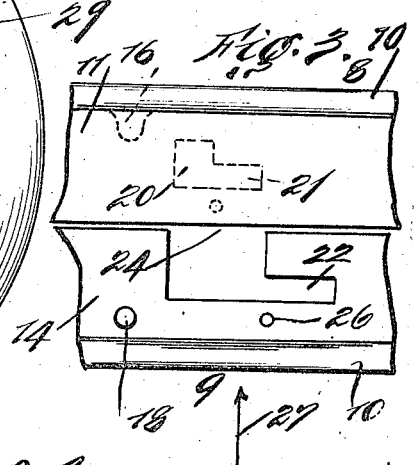
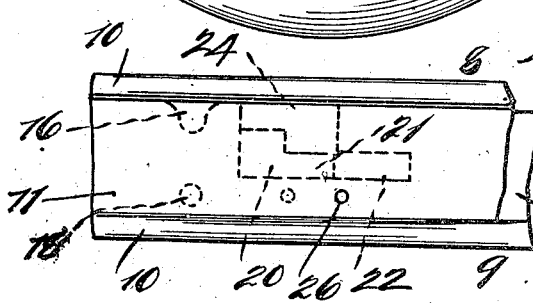
INVENTOR
Benedetto Tamburello
BY
Maurice Bloch
ATTORNEY

B. TAMBURELLO.
DEMOUNTABLE RIM FOR TIRES.
APPLICATION FILED APR. 15, 1919.

1,320,104.

Patented Oct. 28, 1919.
2 SHEETS—SHEET 2.

INVENTOR
Benedetto Tamburello
BY
Maurice Bloch
ATTORNEY

UNITED STATES PATENT OFFICE.

BENEDETTO TAMBURELLO, OF NEW YORK, N. Y.

DEMOUNTABLE RIM FOR TIRES.

1,320,104.   Specification of Letters Patent.   Patented Oct. 28, 1919.

Application filed April 15, 1919. Serial No. 290,116.

*To all whom it may concern:*

Be it known that I, BENEDETTO TAMBURELLO, a citizen of the United States of America, residing at New York city, county and State of New York, have invented certain new and useful Improvements in Demountable Rims for Tires, of which the following is a full, clear, and exact description.

This invention relates to improvements in demountable rims for motor-vehicles, the object being to provide a rim of the demountable type consisting of separably connected members that can be easily taken apart for removal from or application to a tire.

One of the objects of my invention is to provide a rim that can be easily applied to a tire and also easily removed therefrom. To accomplish this result, I provide a rim consisting of (in this instance) two members arranged so that one can be slipped into the other, and also so arranged that the tire itself will form no hindrance to the application or removal of the rim.

I will now describe the manner of carrying out the above mentioned objects, reference being had to the accompanying drawings, wherein:—

Figure 1 is a cross sectional view of a demountable rim made in accordance with my invention;

Fig. 2 is a sectional fragmentary perspective view illustrating the manner of securing the rim members together;

Fig. 3 is a diagrammatic detail view illustrating the rim members positioned for assemblage;

Fig. 4 is a similar view illustrating the rim members assembled, but not locked;

Fig. 5 is a side view of a wheel equipped with a tire and my improved rim;

Figure 6:
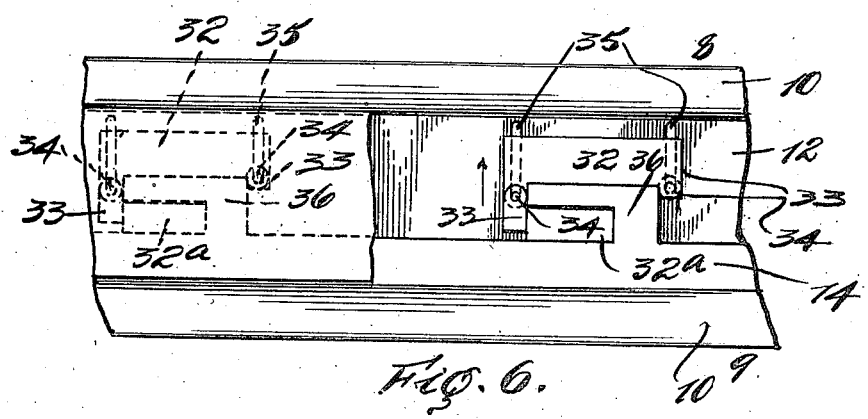
Fig. 6 is a fragmentary plan view of a modified form of lock for the rim-members.
Figure 7:
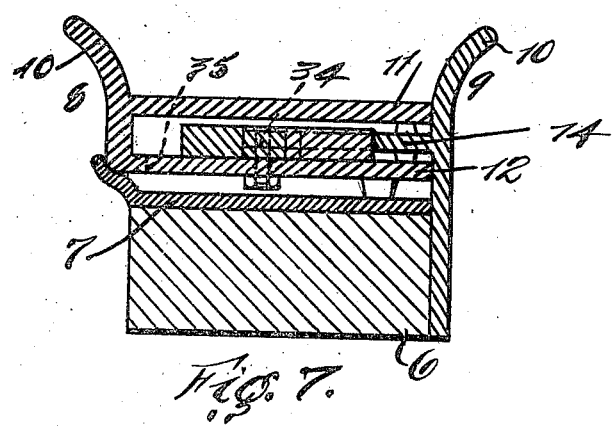
Fig. 7 is a cross sectional view thereof.

Referring to Fig. 1, the felly of a wheel is indicated by 6, said wheel having the usual felly band 7. My improved rim consists of two members 8 and 9, each provided with a rim flange 10 for a straight side tire (in this instance), although rim-flanges for a clencher tire may also be employed. The rim member 8 consists of the herein mentioned rim-flanges 10 and two annular spaced apart plates 11 and 12 disposed in parallelism. The annular plates 11 and 12 are spaced apart to provide a channel 13 to receive the annular plate 14, which projects from the side plate 15, which in turn carries the other rim flange 10 for a tire. Within the channel 13, I form lugs 16 and 17, spaced apart to receive the plate 14. The plate 14 also carries lugs 18 and 19, which bear against the sides of the channel 13. The lugs 16, 17, 18 and 19 form supports for the plate 14, thereby obviating the necessity of having the plate 14 contact with plates 11 and 12, as such a condition would be objectionable, on account of the liability of the said plates rusting together. The lugs 16, 17, 18 and 19 will prevent the rusting of the plates together.

To lock the rim members after they have been assembled, I place within the channel 13 a locking-tongue 20, consisting of an angular member (in this instance), having a projection 21 to enter a slot 22 extending from an opening 23, cut in from the inner edge 24 of the plate 14. The locking connection above mentioned is in the nature of a bayonet-joint. After the rim members have been connected, in a manner to be described, I secure them still further by a screw 25, passing through plate 12, through plate 14 and engaging a threaded opening 26 in plate 11. To assemble the rim members, should they be separated, the plate 14 will be placed in alinement with channel 13, the opening 23 in plate 14 alining with the tongue 20 in channel 13. (See Fig. 3.) The rim-member 9 will now be pushed in, in the direction of the arrow 27, to the position indicated in Fig. 4, after which rim member 9 will be rotated in the direction of the arrow 28 (Fig. 4), until projection 21 of tongue 20 enters slot 22 in the rim-plate 14, as indicated in Fig. 2. After the rim-members have been thus assembled, the fastening screw 25 will be applied; hence the rim-member 9 cannot be prematurely unlocked. The screw 25 will of course be applied before the rim is placed on the wheel, or removed after the rim has been taken from the wheel. The side plate 15, as can be seen, extends the width of the felly 6.

The means for fastening the rim to the wheel consists of bolts 29, which pass through the plate 15 and engage threaded thimbles 30 carried by the felly 6. The thimbles are inserted into the felly 6, as can be seen in Fig. 1, and the bolts 29 pass through the felly to engage the thimbles. Lock-washers 31 may be employed to prevent the bolts 29 from shaking loose. My improved rim is easily taken apart and it will be seen that the tire itself will in no way interfere with the assembling or disassembling of the rim, as the tire will bear upon plate 11 and not upon plate 14, which is the movable plate or the plate that is removed.

One of the features of my tire is that the tire does not have to be peeled off the rim, as is the case with the split rim for straight side tires. Furthermore, a tire can be more easily applied to my improved rim than to the above mentioned split rim, which requires tools to pry the tire on. A tire can be slipped onto plate 11 after which the plate 14 can be placed in channel 13 and easily moved into place.

To prevent the channeled rim member 8 from rusting to the felly-band 7, I provide the plate 12 with lugs 12ª to space the plate 17 away from the band 7.

Instead of employing a screw, such as 25, to hold the rim member 9 against premature rotation, I may employ a slidable locking block 32 (see Fig. 6), having projections 33 at each end thereof. The block 32 will carry pins 34 engaging slots 35 in the lower plate 12 of the rim member. After plate 14 is caused to engage the square locking block 32ª, the block 32 will be moved in to cause the projections 33 to be positioned at adjacent ends of the angular tongue 36 carried by the rim member 9, after which said rim-member will be held against premature rotation. (See Fig. 6.) When the rim is placed upon the wheel, the block 32 will be prevented from moving out of engagement with the tongue 36. It will, of course, be understood that there will be a plurality of locking blocks 20 in the form illustrated in Fig. 1, or a plurality of blocks 32ª, as in the form illustrated in Fig. 6.

Having described my invention, what I claim is:—

1. In a demountable rim, a channeled member, an annular plate member to engage the same, means within the channel to maintain the plate member out of contact with the walls of the channel member, and rim flanges carried by said members.

2. In a demountable rim, a channeled member, an annular plate member to engage the same, means within the channel to maintain the plate member out of contact with the walls of the channel member, rim flanges carried by said members, and locking means within the channel of the channeled member to engage said plate member.

Signed at New York city, N. Y., this 11th day of April, 1919.

BENEDETTO TAMBURELLO.

Witnesses:
 MAURICE BLOCK,
 EDWARD A. JARVIS.